UNITED STATES PATENT OFFICE.

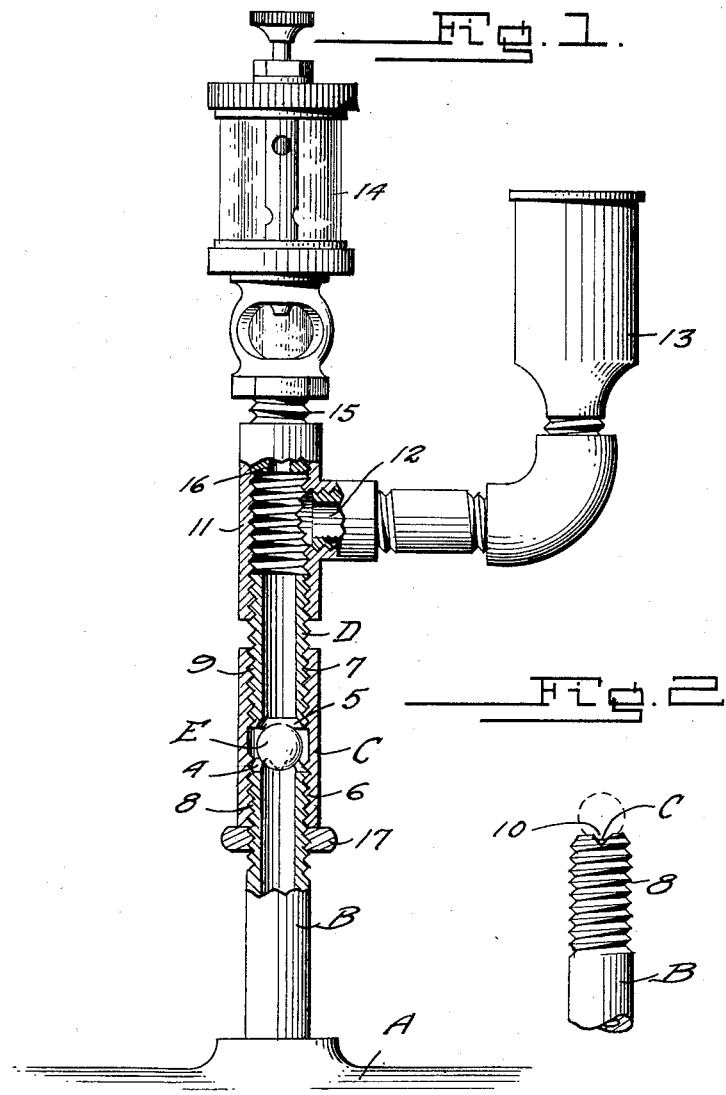

CHARLES M. RININGER, OF ELKHART, INDIANA, ASSIGNOR OF ONE-HALF TO FRANK H. GLORE, OF ELKHART, INDIANA.

LUBRICATOR.

1,114,288. Specification of Letters Patent. Patented Oct. 20, 1914.

Application filed May 13, 1913. Serial No. 767,353.

*To all whom it may concern:*

Be it known that I, CHARLES M. RININGER, citizen of the United States, residing at Elkhart, in the county of Elkhart and State of Indiana, have invented certain new and useful Improvements in Lubricators, of which the following is a specification.

My present invention relates to apparatus adapted to control fluid under pressure so that this movement is in accordance with the design of certain mechanisms or apparatus so as to maintain the same in good repair.

The principal object of my invention is to provide apparatus embodying a check valve having seats spaced apart from each other and adjusted so that the movement of the fluid may be controlled to a nicety.

Other objects of my invention are to provide apparatus of the character described which is simple in construction and hence, inexpensive to manufacture; an apparatus which may be embodied with existing machines, such as gas engines or apparatus such as conduits used in the transfer of fluid, under pressure, from one place to another; and, apparatus which is positive in its action so as to avoid accidents such as occur from excess pressure upon the fluid.

Other object of the invention will appear in the following detail description, taken in connection with the accompanying drawings forming a part of the specification, and in which drawings:—

Figure 1 is a view partly in section and partly in elevation disclosing apparatus constructed according to my invention; Fig. 2 is a detail view in elevation showing means providing a valve seat.

In the drawings, where similar characters refer to similar parts throughout the views, A designates a chamber adapted to contain fluid under pressure; B a pipe in communication therewith; C a sleeve or conduit adjustable longitudinally with respect to pipe B; and, D a second pipe in communication with the bore of sleeve C. Within the sleeve C I provide a ball valve E and the pipe B is disposed in an upright position so that the ball valve normally rests upon the upper portion thereof due to the force of gravity.

Referring to the drawings, wherein the invention is applied in connection with apparatus for controlling the exhaust fluid from chamber A in order that a fluid, such as oil may be introduced into said chamber at suitable intervals, it is to be noted that the pipe B is formed with the seat 4 pervious to fluid regardless as to the position of ball valve E with respect thereto. The lower portion of pipe D provides a seat 5, so that when the ball valve is raised and engages the said seat, fluid is prevented from passing from chamber A through pipe D. As a suitable means for adjusting seats 4 and 5 one with respect to the other, the sleeve 3 is internally screw threaded as at 6 and 7, while the pipes B and D have complimentary threads 8 and 9, respectively.

The seat C is made pervious to fluid as by making incisions 10 in the upper portion of the pipe. A T-shaped connection 11 may provide an exhaust way 12, bringing the pipe D in communication with the atmosphere as through the exhaust dome 13. Surmounted upon fitting 11 I have provided an oil cup 14 of any suitable type, and having means 15 in the form of a screw threaded stem, which provides a way 16 in communication with the bore of pipe D. The way 16 is relatively smaller than the exhaust-way 12 so that any fluid which passes valve E from chamber A may pass freely to the atmosphere.

I find it desirable to provide a nut lock 17 so that when the seats 4 and 5 are spaced apart from each other a desired distance the adjustment will not be altered by vibration of the several elements.

The operation of the apparatus disclosed in Figs. 1 and 2 is as follows:—Assuming that the chamber 9 is a cylinder of a gas engine, and that it is desired to introduce oil thereinto, this oil, which drops by gravity through ways 16 into pipe D, is permitted to pass valve E and into pipe B as through the incisions 10. As the piston in cylinder 9 moves for exhaust or compression of fluid in the cylinder, the valve E is quickly raised and engages seat 5. Such fluid as finds its way past valve E from chamber 9 is quickly exhausted to the atmosphere and has little effect upon the oil flowing by gravity from the cup 14. As soon as the pressure is materially reduced in the cylinder 9, or the piston moves in its intake stroke, the valve E drops by gravity and oil passes by seat C on into chamber A.

I claim:—

1. In a lubricator adapted to be connected to a fluid pressure chamber, the combination of a chamber adapted to contain fluid under pressure, an upright pipe in communication therewith and having its upper end formed to provide a pervious valve seat, a sleeve adjustable longitudinally of said pipe, a valve in said sleeve, a second pipe adjustable longitudinally of said sleeve and providing a seat for said valve, said seat being disposed above the latter to prevent passage of fluid through said second mentioned pipe from said chamber when said valve is seated thereon, a means providing an exhaust to the atmosphere from said second mentioned pipe and above the seat thereof, and means providing a way for introduction of fluid to said second mentioned pipe above the seat thereof.

2. In a lubricator adapted to be connected to a fluid pressure chamber, the combination of a chamber adapted to contain fluid under pressure, an upright pipe in communication therewith and having its upper end formed to provide a pervious valve seat, a sleeve adjustable longitudinally of said pipe, a valve in said sleeve, a second pipe adjustable longitudinally of said sleeve and providing a seat for said valve, said seat being disposed above the latter to prevent passage of fluid through said second mentioned pipe from said chamber when said valve is seated thereon, a means providing an exhaust to the atmosphere from said second mentioned pipe and above the seat thereof, and means providing a way for introduction of fluid to said second mentioned pipe above the seat thereof, said way being relatively smaller than the said exhaust, substantially as and for the purpose set forth.

In testimony whereof I affix my signature in presence of two witnesses.

CHARLES M. RININGER.

Witnesses:
ROBERT G. DALTON,
JOHN T. DALTON.